(12) United States Patent
Gong (10) Patent No.: US 11,202,163 B2
(45) Date of Patent: Dec. 14, 2021

(54) AUDIO OUTPUT METHOD, ELECTRONIC DEVICE, AND AUDIO OUTPUT APPARATUS

(71) Applicant: Lenovo (Beijing) Co., Ltd., Beijing (CN)

(72) Inventor: Jiangtao Gong, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/691,343

(22) Filed: Nov. 21, 2019

(65) Prior Publication Data

US 2020/0169825 A1 May 28, 2020

(30) Foreign Application Priority Data

Nov. 26, 2018 (CN) .......................... 201811422826.1

(51) Int. Cl.
*H04S 7/00* (2006.01)
*G06K 9/00* (2006.01)

(52) U.S. Cl.
CPC .......... *H04S 7/303* (2013.01); *G06K 9/00624* (2013.01); *H04S 2400/11* (2013.01)

(58) Field of Classification Search
USPC ................ 381/150, 303, 310, 367, 370, 376
See application file for complete search history.

(56) References Cited

U.S. PATENT DOCUMENTS

2019/0289417 A1* 9/2019 Tomlin .................... H04S 7/303

FOREIGN PATENT DOCUMENTS

| CN | 103838374 A | 6/2014 |
|---|---|---|
| CN | 104065869 A | 9/2014 |
| CN | 105916096 A | 8/2016 |
| CN | 106528038 A | 3/2017 |
| CN | 106909222 A | 6/2017 |
| CN | 107168518 A | 9/2017 |
| CN | 107193386 A | 9/2017 |
| CN | 107608519 A | 1/2018 |
| CN | 107632700 A | 1/2018 |
| CN | 107632703 A | 1/2018 |
| CN | 108492375 A | 9/2018 |
| CN | 108574925 A | 9/2018 |
| CN | 108604122 A | 9/2018 |
| CN | 108874471 A | 11/2018 |

* cited by examiner

*Primary Examiner* — Yosef K Laekemariam
(74) *Attorney, Agent, or Firm* — Anova Law Group, PLLC (57) ABSTRACT

The present disclosure provides an audio output method, including acquiring attribute information and location information of at least one object from an environment in which a user is located; determining, based on the attribute information, at least one piece of audio information that corresponds to the at least one object; determining, based on the location information, a relative spatial relationship between the at least one object and the user; adjusting, based on the relative spatial relationship, an output parameter of the at least one piece of audio information; and outputting, based on the output parameter, the at least one piece of audio information indicative of the location information of the at least one object.

9 Claims, 8 Drawing Sheets

AUDIO OUTPUT METHOD, ELECTRONIC DEVICE, AND AUDIO OUTPUT APPARATUS

CROSS-REFERENCE TO RELATED APPLICATION

This application claims the priority to Chinese Patent Application No. 201811422826.1, entitled "Audio Output Method, Electronic Device, and Audio Output Apparatus," filed on Nov. 26, 2018, the entire content of which is incorporated herein by reference.

TECHNICAL FIELD

The present disclosure relates to an audio output method, an electronic device, and an audio output apparatus.

BACKGROUND

With the rapid development of technology, various electronic devices are increasingly used in many real life scenarios, among which electronic devices have various functions, such as an audio output function. However, as users have higher functional requirements on the audio output of electronic devices, the audio output function of existing electronic devices often cannot satisfy the needs of users. Therefore, it is desirable to provide an optimized audio output function to enhance the user experience.

SUMMARY

In one aspect of the present disclosure, an audio output method is provided. The audio output method includes: acquiring attribute information and location information of at least one object from an environment in which a user is located; determining, based on the attribute information, at least one piece of audio information that corresponds to the at least one object; determining, based on the location information, a relative spatial relationship between the at least one object and the user; adjusting, based on the relative spatial relationship, an output parameter of the at least one piece of audio information; and outputting, based on the output parameter, the at least one piece of audio information indicative of the location information of the at least one object.

In some embodiment, the audio output method further includes: determining a specific object from the at least one object; adjusting, based on the relative spatial relationship, an output parameter of the audio information that corresponds to the specific object to be a first output parameter; and adjusting, based on the relative spatial relationship, an output parameter of the audio information that corresponds to one or more objects of the at least one object to be a second output parameter.

In some embodiment, determining a specific object from the at least one object includes: selecting, based on a user selection operation, the specific object from the at least one object; and determining, based on the relative spatial relationship of the at least one object to the user, an object that satisfies a condition as the specific object.

In some embodiment, the audio output method further includes: acquiring a relative position of a body part of the user to the at least one object; and when the relative position of the body part of the user to the at least one object changes from a first relative position to a second relative position, adjusting the output parameter of the audio information that corresponds to the at least one object.

In some embodiment, acquiring attribute information and location information of at least one object from an environment in which the user is located includes at least one of: acquiring the attribute information and location information of the at least one object from the environment in which the user is located by image recognition; acquiring a tag information of the at least one object from the environment in which the user is located, the tag information including the attribute information of the at least one object and the location information; or acquiring an object identifier of the at least one object from the environment in which the user is located, determining, based on the object identifier, the attribute information of the at least one object, and determining, based on the object identifier and electronic map data, the location information of the at least one object.

In some embodiment, the audio output method further includes: recording audio information of the at least one object; and adjusting, based on the relative spatial relationship, the output parameter of the at least one piece of audio information. Adjusting, based on the relative spatial relationship, the output parameter of the at least one piece of audio information includes adjusting, based on the relative spatial relationship, the output parameter of the recorded audio information of the at least one object.

In some embodiment, the at least one object includes: a real object and a virtual object.

In another aspect of the present disclosure, an electronic device is provided. The electronic device includes: one or more processors; and a memory for storing executable instructions, when executed, causing the one or more processors to: acquire attribute information and location information of at least one object from an environment in which a user is located; determine, based on the attribute information, at least one piece of audio information that corresponds to the at least one object; determine, based on the location information, a relative spatial relationship between the at least one object and the user; adjust, based on the relative spatial relationship, an output parameter of the at least one piece of audio information; and output, based on the output parameter, the at least one piece of audio information indicative of the location information of the at least one object.

In some embodiment, the memory is further configured to: determine a specific object from the at least one object; adjust, based on the relative spatial relationship, an output parameter of the audio information that corresponds to the specific object to be a first output parameter; and adjust, based on the relative spatial relationship, an output parameter of the audio information that corresponds to one or more other objects of the at least one object to be a second output parameter.

In some embodiment of the electronic device, the memory is further configured to select, based on a user selection operation, the specific object from the at least one object; and determine, based on the relative spatial relationship of the at least one object to the user, an object that satisfies a condition as the specific object.

In some embodiment of the electronic device, the memory is further configured to: acquire a relative position of a body part of the user to the at least one object; and when the relative position of the body part of the user to the at least one object changes from a first relative position to a second relative position, adjust the output parameter of the audio information that corresponds to the at least one object.

In some embodiment of the electronic device, acquire attribute information and location information of at least one object from an environment in which the user is located includes at least one of: acquire the attribute information and location information of the at least one object from the environment in which the user is located by image recognition; acquire a tag information of the at least one object from the environment in which the user is located, the tag information including the attribute information of the at least one object and the location information; or acquire an object identifier of the at least one object from the environment in which the user is located, determine, based on the object identifier, the attribute information of the at least one object, and determine, based on the object identifier and electronic map data, the location information of the at least one object.

In some embodiment of the electronic device, the memory is further configured to: record audio information of the at least one object; and adjust, based on the relative spatial relationship, the output parameter of the recorded audio information of the at least one object.

In further aspect of the present disclosure, an audio output apparatus is provided. The audio output apparatus includes: an acquisition module, configured to acquire attribute information and location information of at least one object from the environment in which a user is located; a first determination module, configured to determine, based on the attribute information, at least one piece of audio information that corresponds to the at least one object; a second determination module, configured to determine, based on the location information, a relative spatial relationship between the at least one object and the user; and an adjusting module, configured to adjust, based on the relative spatial relationship, an output parameter of the at least one audio information, and output, based on the output parameter, the at least one piece of audio information indicative of the location information of the at least one object.

In some embodiment, the audio output apparatus further includes: a third determination module, configured to: determine a specific object from the at least one object; adjust, based on the relative spatial relationship, an output parameter of the audio information that corresponds to the specific object to be a first output parameter; and adjust, based on the relative spatial relationship, an output parameter of the audio information that corresponds to one or more other objects of the at least one object to be a second output parameter.

In some embodiment of the audio output apparatus, the third determination module is further configured to: select, based on a user selection operation, the specific object from the at least one object; and determine, based on the relative spatial relationship of the at least one object to the user, an object that satisfies a condition as the specific object.

In some embodiment, the audio output apparatus further includes: a second acquisition module configured to: acquire a relative position of a body part of the user to the at least one object; and when the relative position of the body part of the user to the at least one object changes from a first relative position to a second relative position, adjust the output parameter of the audio information that corresponds to the at least one object.

In some embodiment, the audio output apparatus further includes a recording module, configured to: record audio information of the at least one object; and adjust, based on the relative spatial relationship, the output parameter of the recorded audio information of the at least one object.

In further aspect of the present disclosure, a non-transitory computer-readable medium storage is provided. The non-transitory computer-readable medium storage is configured for storing one or more programs, when executed, causing one or more processors to perform an audio output method, including: acquire attribute information and location information of at least one object from an environment in which a user is located; determine, based on the attribute information, at least one piece of audio information that corresponds to the at least one object; determine, based on the location information, a relative spatial relationship between the at least one object and the user; adjust, based on the relative spatial relationship, an output parameter of the at least one piece of audio information; and output, based on the output parameter, the at least one piece of audio information indicative of the location information of the at least one object.

In some embodiment of the non-transitory computer-readable storage medium, the one or more programs, when executed, further cause the one or more processors to: determine a specific object from the at least one object; select, based on a user selection operation, the specific object from the at least one object; and determine, based on the relative spatial relationship of the at least one object to the user, an object that satisfies a condition as the specific object.

The above aspects will be described in detail with accompanying drawings.

BRIEF DESCRIPTION OF THE DRAWINGS

For a more complete understanding of the present disclosure and its advantages, reference will now be made to the following description.

DETAILED DESCRIPTION OF THE EMBODIMENTS

Hereinafter, embodiments of the present disclosure will be described with reference to the drawings. It should be understood, however, that the description is only illustrative, and is not intended to limit the scope of the present disclosure. In the following detailed description, numerous specific details are set forth. However, it is apparent that one or more embodiments may be practiced without these specific details. In addition, descriptions of well-known structures and techniques are omitted in the following description in order to avoid unnecessarily obscuring the concept of the present disclosure.

The terminology used herein is for the purpose of describing the particular embodiments. The use of the terms, i.e., "comprising", "comprising", illustrate the features, steps, operations and/or existence of components, but does not exclude the existence of one or more other features, steps, operations and/or components.

All terms (including technical and scientific terms) used herein have the meaning commonly understood by one of ordinary skill in the art, unless otherwise defined. It should be noted that the terms used herein are to be interpreted as having a meaning consistent with the context of the present specification and should not be interpreted in an ideal or too rigid manner.

Where an expression similar to "at least one of A, B, and C, etc." is used, it should generally be interpreted in accordance with the meaning of the expression as commonly understood by those skilled in the art, for example, "having at least one of systems A, B, and C" shall include, but are not limited to, systems having A alone, B alone, C alone, A and B, A and C, B and C, and/or A, B, C, etc. Where an expression similar to "at least one of A, B or C, etc." is used, it should generally be interpreted according to the meaning of the expression as commonly understood by those skilled in the art, for example, "having at least one of systems A, B or C" shall include, but are not limited to, systems having A alone, B alone, C alone, A and B, A and C, B and C, and/or A, B, C, etc.

Some block diagrams and/or flowcharts are shown in the drawings. It will be understood that some blocks or combinations of the block diagrams and/or flowcharts can be implemented by computer program instructions. These computer program instructions may be provided to a general purpose computer, a special purpose computer or a processor of other programmable data processing apparatus such that when executed by the processor, the instructions may be used to implement the functions and/or operations illustrated in the block diagrams and/or flowcharts.

Thus, the techniques of this disclosure may be implemented in the form of hardware and/or software including firmware, microcode, etc. Additionally, the techniques of this disclosure may take the form of a computer program product on a computer readable medium, which store instructions, for use by, or in connection with, an instruction execution system. In the context of the present disclosure, a computer readable medium can be any medium that can contain, store, transfer, propagate or transmit instructions. For example, a computer readable medium can include, but is not limited to, an electronic, magnetic, optical, electromagnetic, infrared, or semiconductor system, apparatus, device, or propagation medium. Specific examples of the computer readable medium include: a magnetic storage device such as a magnetic tape or a hard disk (HDD); an optical storage device such as a compact disk (CD-ROM); a memory such as a random-access memory (RAM) or a flash memory; and/or a wired or wireless communication link.

In some embodiments of the present disclosure, an audio output method is provided. The audio output method may include: acquiring attribute information and location information of at least one object in an environment in which a user is located; and determining, based on the attribution information, at least one piece of audio information that corresponds to the at least one object; determining, based on the location information, a relative spatial relationship between the at least one object and the user; adjusting, based on the relative spatial relationship, an output parameter of the at least one piece of audio information; and outputting, based on the output parameter, the at least one piece of audio information. Accordingly, the user can perceive location information of the at least one object based on the at least one piece of audio information.

Accordingly, in the technical solution of the embodiment of the present disclosure, attribute information and location information of the object in an environment in which a user is located is acquired, the audio information that corresponds to the object may be determined according to the attribute information, and a relative spatial relationship between the object and the user may be determined based on the location information. Based on the relative spatial relationship, the output parameter of the audio information may be adjusted, and based on the output parameter, the audio information may be output, so that: the user can perceive the location information of the object according to the audio information, to achieve intelligently adjusting the audio output corresponding to the object according to the attribute information and the location information of the object; and the user can perceive the location information of the object according to the audio, to enhance the user's sense of live experience and satisfy the user's demand for an audio output function.

Figure 1:
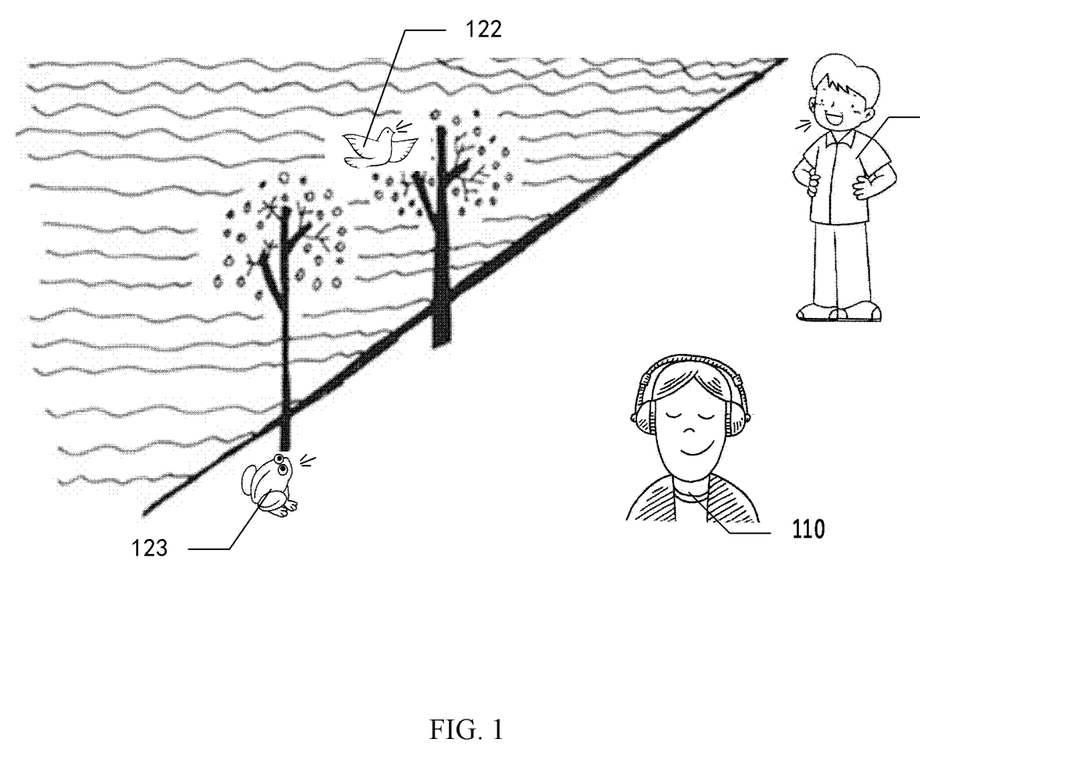
FIG. 1 illustrates an application scenario of an audio output method and an electronic device according to some embodiment of the present disclosure.

FIG. 1 illustrates an application scenario of an audio output method and an electronic device according to some embodiment of the present disclosure. It should be noted that FIG. 1 is only an example of a scenario in which an embodiment of the present disclosure may be applied, to help those skilled in the art understand the technical content of the present disclosure, but does not implicate that the embodiments of the present disclosure may not be applied to other devices, systems, environments or scenarios.

As shown in FIG. 1, an application scenario 100 may include: a user 110 and a plurality of objects 121, 122, and 123.

In some embodiment of the present disclosure, the user 110 may, i.e., wear an electronic device, which may be, i.e., a device having an audio playing function. The electronic device has, i.e., its own processor, which may be configured to process related information acquired by the electronic device and control, i.e. an audio output function, of the electronic device. For example, the electronic device may be a head wearable device such as a device having an audio output function, i.e., a helmet or a smart earphone. The electronic device may, for example, integrate mixed reality technologies; that is, can output audio information related to a real environment and a virtual environment.

In some embodiment of the present disclosure, the plurality of objects may be, for example, objects in a surrounding environment, i.e., a human being 121, other biological classes 122, 123, etc. The plurality of objects may be real objects or virtual objects.

In some embodiment of the present disclosure, the user 110 can acquire an object from the surrounding environment, i.e., by using an electronic device, and acquire audio information that correspond to the plurality of objects from the audio database of the electronic device; by determining a relative spatial relationship between the user 110 and the plurality of objects, and based on the relative spatial relationship between the user 110 and the plurality of objects, the audio information corresponding to the plurality of objects may be played to the user. Accordingly, the user can perceive the location information of the plurality of objects based on the audio information.

Specifically, as shown in FIG. 1, the user 110 wear an electronic device. Such electronic device may be able to acquire a plurality of objects in the surrounding environment, i.e., the human being 121, a bird 122, a frog 123, etc., and acquire a human voice, a bird sound, a frog sound from a sound source database, and based on a relative spatial relationship between the plurality of objects and the user 110, render a corresponding sound of the object and output the sound, so that the user can perceive the location information of the plurality of objects according to the sound, enhance the sense of live experience, and satisfy the need for an audio output function.

Figure 2:
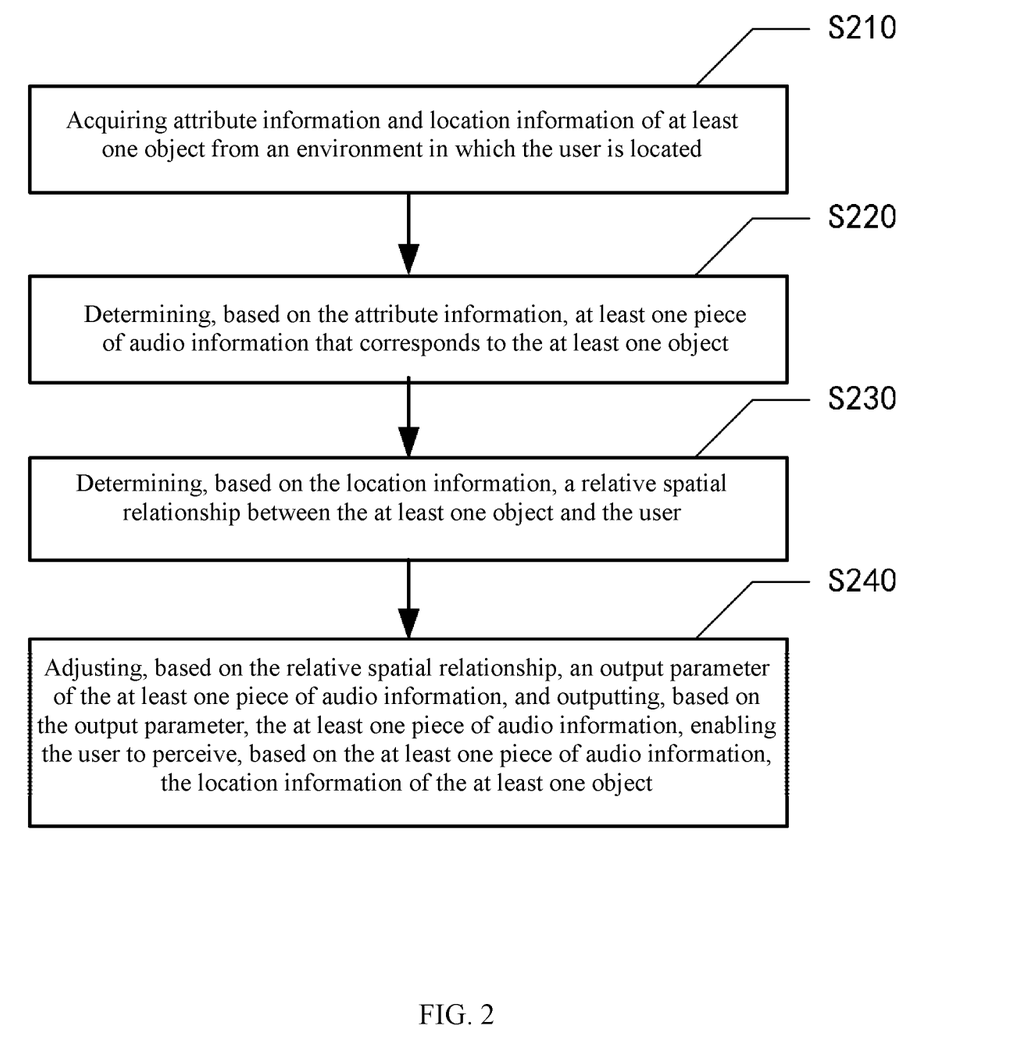
FIG. 2 illustrates a first flowchart of an audio output method according to some embodiment of the present disclosure.

FIG. 2 illustrates a flow chart of an audio output method according to some embodiment of the present disclosure.

As shown in FIG. 2, the method includes steps S210 to S240.

In step S210, attribute information and location information of at least one object from an environment in which the user is located may be acquired.

According to some embodiment of the present disclosure, the user may, for example, be able to wear a device having an audio playing function, which may be, for example, a device having a mixed reality function; that is, the mixed reality function includes a virtual reality function and an augmented reality function. The device may be a head wearable device, for example, a helmet, an earphone, etc.

In some embodiment of the present disclosure, the at least one object includes: a real object and/or a virtual object.

The real object may be a creature or an object in the environment in which the user is located. The creature may include, for example, a human being, an animal, etc., and the object may be, for example, a tree, a river, an exhibit in a museum, a product in a store, etc. The virtual object may be, for example, a virtual character, a virtual object, etc.

According to some embodiment of the present disclosure, the attribute information of the object may be configured, i.e., to characterize an identity of an object. For example, the attribute information of a person may be gender, age, etc., and the attribute information of an animal may, for example, characterize an animal, such as a bird or a dog. For example, attribute information of a river may indicate a turbulence of the river; attribute information of an exhibit in a museum may be a name of the exhibit; and attribute information of a product in the store may be a product ID of the product, etc.

In some embodiment of the present disclosure, the object location information may be a specific location where the object is located, or may be a relative location of the object or the user, etc.

In some embodiments of the present disclosure, the attribute information and the location information of the object may be acquired by any of the following methods.

(1) Acquiring the attribute information and the location information of the at least one object in the environment in which the user is located by image recognition.

According to some embodiment of the present disclosure, an object in an image may be recognized by image recognition technology, and the attribute information and the location information of the object may be identified, for example, by acquiring an image of the environment. For example, when the object is a human, a gender, an age, etc. of the object, and the location information of the environment in which the object is, may be identified, for example, by image recognition.

(2) Acquiring a tag information of at least one object from the environment in which the user is located, the tag information including the attribute information and the location information of the at least one object.

According to some embodiment of the present disclosure, for example, in a museum, the museum displays a plurality of exhibits, each exhibit has its own tag information, and the tag information may include the attribute information and the location information of the exhibit, and the label may be an electronic tag. The attribute information and the location information of the exhibit may be acquired by acquiring the electronic tag.

(3) Acquiring an object identifier of at least one object from the environment in which the user is located; determining, based on the object identifier, the attribute information of the at least one object; and determining, based on the object identifier and electronic map data, the location information of the at least one object.

According to some embodiment of the present disclosure, the object identification may be, for example, an ID of an object capable of characterizing a class of the object. For example, in a store, each product has its own object identifier, and the electronic map includes the distribution of the store and a position in the electronic map corresponding to the object identifier of the product. By acquiring the object identifier of the product, in reference with the electronic map, the class of the product and its location information may be acquired.

In step S220, at least one piece of audio information that corresponds to the at least one object may be determined based on the attribute information.

According to some embodiment of the present disclosure, different objects may correspond to different audio information. For example, men's voices and women's voices are different; middle-aged men's voices and young men's voices are different; and rivers with different turbulences correspond to different sounds. For example, when the object is a middle-aged man, the attribute information of the object may be, for example, a man, and the age is middle age. At this time, for example, a voice information corresponding to the middle-aged man may be determined from an audio information library.

In step S230, a relative spatial relationship between the at least one object and the user may be determined based on the location information.

According to some embodiment of the present disclosure, the relative spatial relationship between the object and the user may be determined based on the location information of the object, and specifically, the relative spatial relationship may be determined based on the location information of the user and the location information of the object. The location information of the user may be the geographic location where the user's head is located. For example, the user's head information may be acquired by using GPS, SLAM, acceleration sensor, gyroscope, accelerometer, etc., so as to conveniently calculate the relative spatial relationship between the user's ears and a virtual object or a real object, i.e., the user may wear the audio output apparatus on his/her ears.

In step S240, based on the relative spatial relationship, an output parameter of the at least one piece of audio information may be adjusted, and the at least one piece of audio information may be output according to the output parameter, so that the user can perceive location information of the at least one object according to the at least one piece of audio information.

According to some embodiment of the present disclosure, the output parameter of the audio information may include, for example, a volume of the audio, a channel of the audio, a frequency of the audio, etc. The output parameter of the audio information may be adjusted according to the relative spatial relationship such that the audio information after the output parameter adjustment may have a rendering 3D effect, that is, real-time rendering of the audio received by the user's ears, so that the audio information received by the user may more realistically reflect the spatial relationship between the user and the object, and the user can perceive the location information of the object through the audio information after the output parameter adjustment.

For example, in the museum scene, a plurality of objects may include a variety of exhibits, such as exhibits including copperware A, porcelain ware B, etc. Copperware A is located on a left side of the user, and porcelain ware B is located on a right side of the user. By adjusting one or more audio output parameters of a voice introduction of the exhibits copperware A and the porcelain ware B, and outputting such adjusted audio information to the user's ear, the user can perceive specific location information of the copperware A and the porcelain ware B according to the audio information. Accordingly, a name and description of the object may be indicated by audio; in other words, the user can learn the name and position of an object through an audio of the object.

It can be appreciated that the solution of embodiments of the present disclosure is more suitable for use in scenes that do not require visual enhancement, such as no visual scenes (i.e., blind user use, closed eye psychotherapy), and visits to museums or stores, navigation, etc.

In some embodiment of the present disclosure, attribute information and location information of an object from an environment in which the user is located may be determined; based on the attribute information, audio information that corresponds to the object may be determined; and based on the location information, a relative spatial relationship between the object and the user may be determined; based on the relative spatial relationship, an output parameter of the audio information may be adjusted; and the audio information may be output according to the output parameter, so that the user can perceive location information of the object according to the audio information, to implement intelligently adjusting the related audio output of the object according to the attribute information and the location information of the object. Accordingly, the user can perceive the position of the object according to the audio, enhance the sense of live experience, and satisfy the need for the audio output function.

Figure 3:
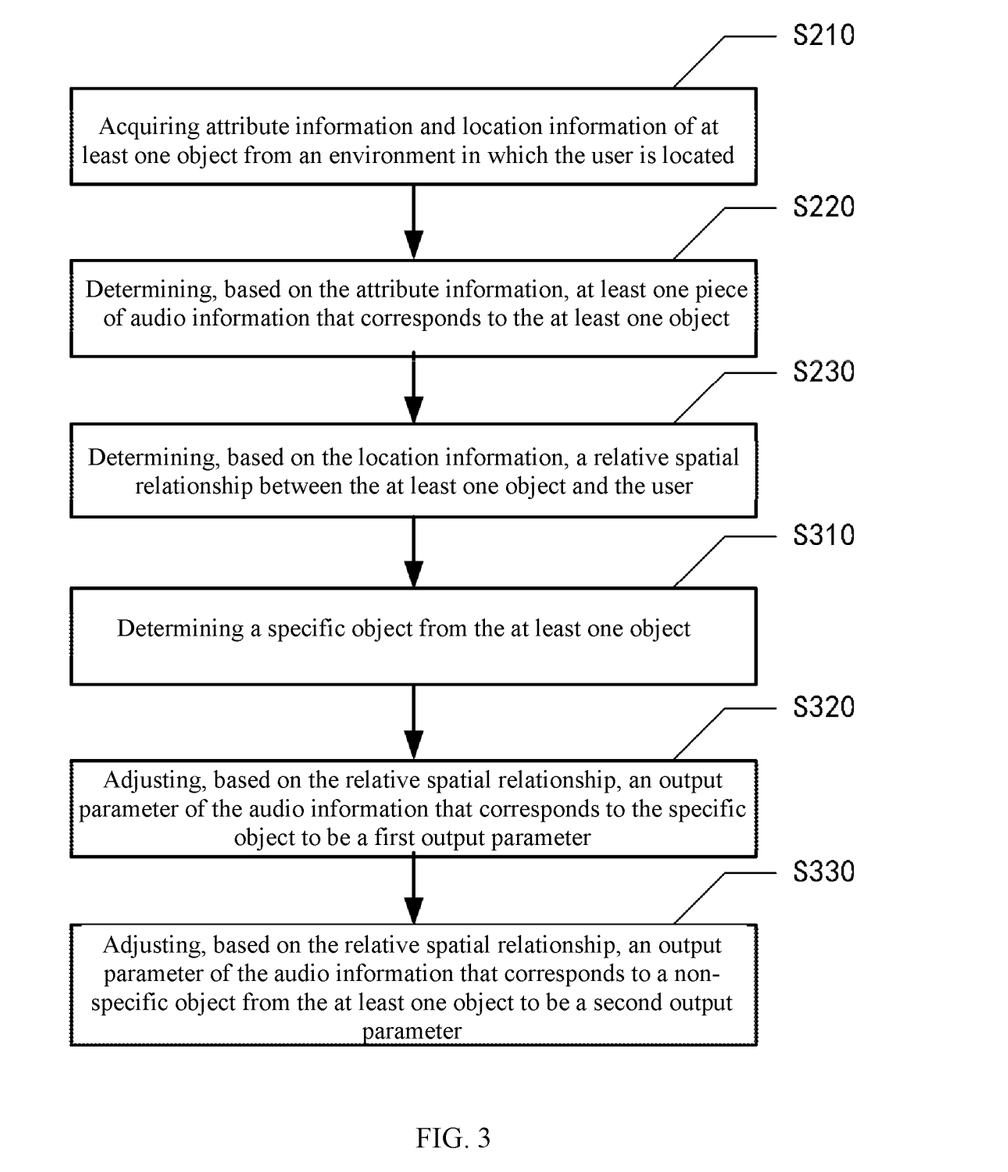
FIG. 3 illustrates a second flowchart of an audio output method according to some embodiment of the present disclosure.

FIG. 3 illustrates a flow chart of an audio output method according to another embodiment of the present disclosure.

As shown in FIG. 3, the method may include steps S210 to S230 and S310 to S330. The steps S210 to S230 are the same with or similar to those described above with reference to FIG. 2, and details are not described herein again.

In step 310, a specific object is determined from at least one object.

According to some embodiment of the present disclosure, the specific object may be, for example, one or more of the plurality of objects.

Determining a specific object may be, for example, selecting the specific object from the at least one object by a selection operation of the user; or determining, based on the relative spatial relationship between the object and the user, an object satisfying a preset condition as the specific object.

For example, the user's selection operation may be a language control operation or a click operation. For example, after acquiring an image of the surrounding environment, the image including a plurality of objects, and after identifying one or more attribute information of the plurality of objects, the user may select an object as a specific object through language control. For example, the identified plurality of objects may be a plurality of exhibits in a museum, and the identified exhibits include copperware A and porcelain ware B. The user can select the copperware A as a specific object by voice. Alternatively, after acquiring an image including the copperware A and the porcelain ware B, the user can select the copperware A as a specific object by clicking the copperware A in the image.

Alternatively, an object that satisfies a preset condition may be selected from a plurality of objects as a specific object, and the preset condition may be, for example, an object that satisfies a preset condition, the relative spatial relationship between the user and the object among a plurality of objects. For example, an object that satisfies a certain distance from a user among a plurality of objects may be the specific object, and the distance may be 5 meters, 10 meters, etc. For example, an object within 5 meters of a user among a plurality of objects may be the specific object.

In step S320, based on the relative spatial relationship, the output parameter of the audio information that corresponds to the specific object may be adjusted to be a first output parameter.

According to some embodiment of the present disclosure, after determining the specific object, the output parameter of the audio information corresponding to the specific object may be adjusted to be a first output parameter. For example, when the specific object is the copperware A, the copperware A is located on a left side of the user, and the audio information corresponding to the copperware A may be, for example, an introduction information about the copperware A, and the first output parameter may be an audio mode, a volume, etc. Specifically, the audio mode may be, for example, the time difference between the audio information input to the left ear and the right ear of the user, that is, the 3D rendering effect may be achieved by adjusting an input mode and a volume of the audio information (e.g., increasing a volume), so that the user can perceive the location information of the copperware A based on the audio information.

In step S330, based on the relative spatial relationship, the output parameter of the audio information that corresponds to the non-specific object from the at least one object may be adjusted to be a second output parameter.

According to some embodiment of the present disclosure, a non-specific object is an object other than a specific object among a plurality of objects. For example, the non-specific object is an object that is far away from the user, or an object that is not of interest to the user. At this time, the audio output parameter of the non-specific object may be adjusted to be a second output parameter. For example, a volume of an audio corresponding to the non-specific object may be adjusted, to reduce the user's perception of the non-specific object and prevent the audio information of the non-specific object from affecting an audio information of the specific object.

Figure 4:
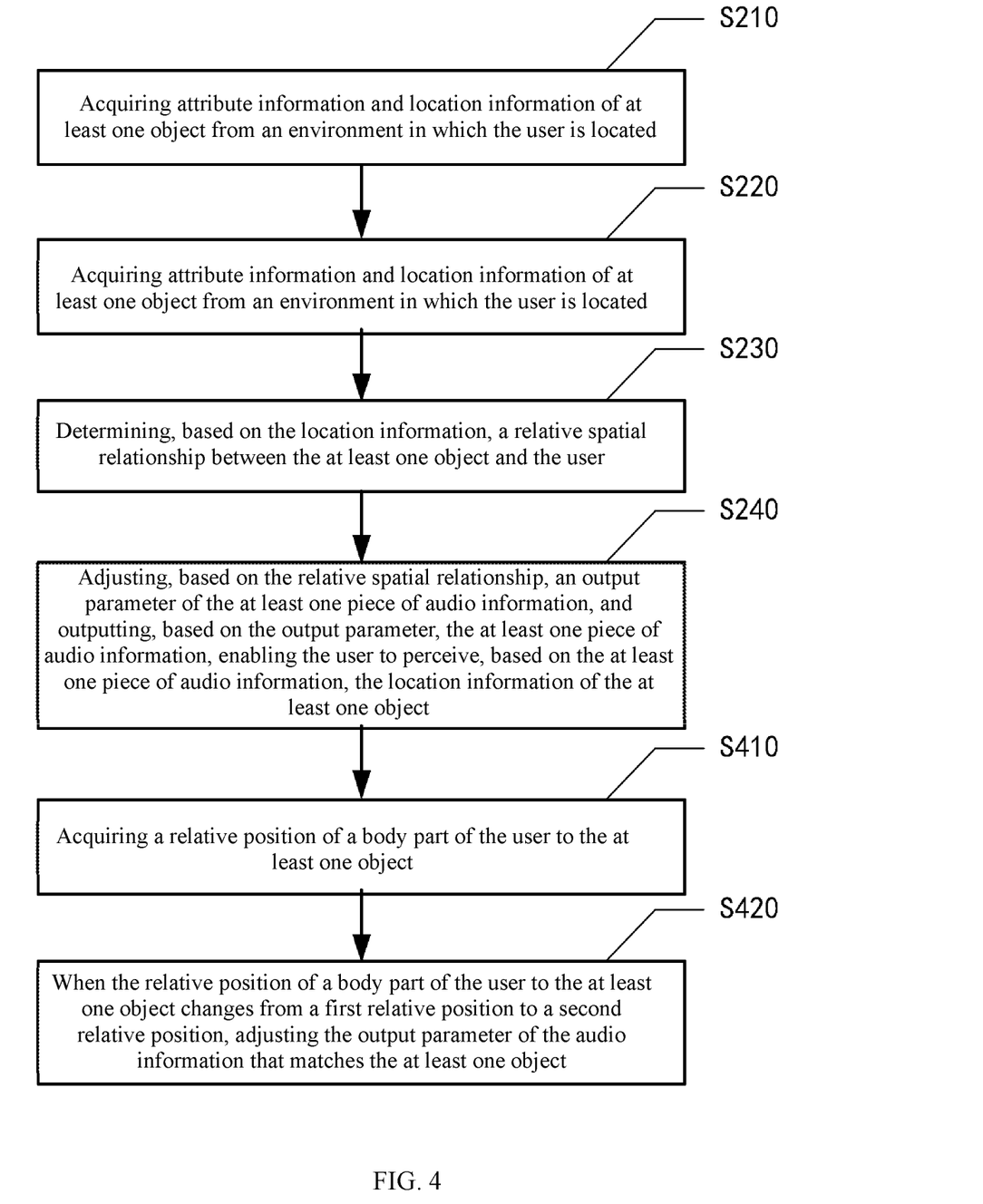
FIG. 4 illustrates a third flowchart of an audio output method according to some embodiment of the present disclosure.

FIG. 4 illustrates a flowchart of an audio output method according to some embodiment of the present disclosure.

As shown in FIG. 4, the method includes steps S210 to S240 and S410 to S420. The steps S210 to S240 are the same with or similar to those described above with reference to FIG. 2, and details are not described herein again.

In step S410, a relative position of a body part of the user to the at least one object may be acquired.

According to some embodiment of the present disclosure, the body part of the user may be, for example, the user's head, and a relative position may be determined by acquiring a geographic position of the user's head and based on the location information of the object. For example, the user's head information can be acquired by GPS, SLAM, acceleration sensor, gyroscope, accelerometer, etc., to calculate the relative position of the user's head to the object.

In step S420, when the relative position of a body part of the user to the at least one object changes from a first relative position to a second relative position, the output parameter of the audio information that corresponds to the at least one object may be adjusted.

According to some embodiment of the present disclosure, for example, a first relative position of the user's head to the object is a position of the object in a positive direction of the user's head, and when the user's head rotates or the position of the object changes, the first relative position changes to a second relative position. For example, a second relative position may be a side position of the object to the user's head. At this time, the output parameter of the audio information of the object may be adjusted, for example, in the first relative position, the output parameter of the audio data is a mode A (the audio information is simultaneously input to user's left and right ears), a volume A (a high volume), and in the second relative position, the output parameter may be adjusted to a mode B (the audio information is input to the user's left and right ears at different times), and a volume B (a low volume), so that the user can perceive the location information of the object in real time based on the audio information.

Figure 5:
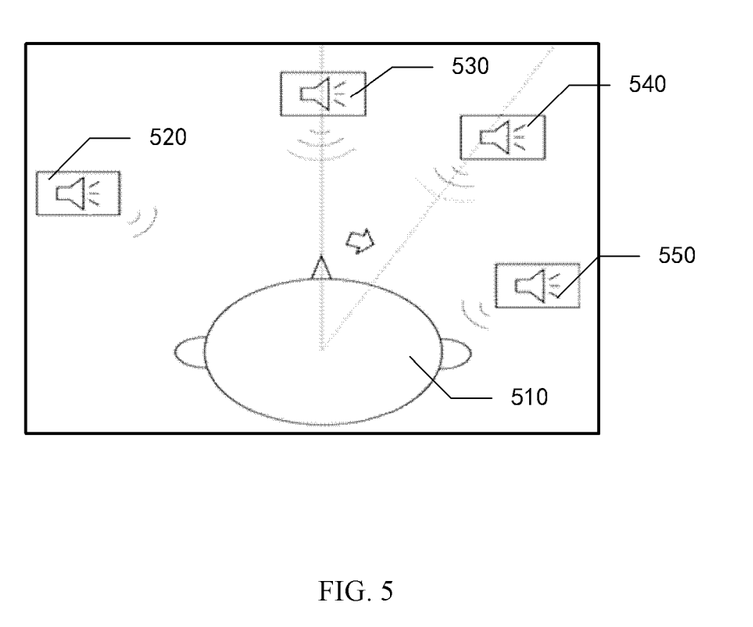
FIG. 5 is a schematic diagram showing an audio output of an electronic device according to some embodiment of the present disclosure.

FIG. 5 is a schematic diagram of an audio output of an electronic device according to some embodiment of the present disclosure.

As shown in FIG. 5, for example, the user 510 may wear an audio output apparatus, such as a headset, a helmet, etc., and the audio output apparatus may further include a sensor, etc., for acquiring location information of the head of the user 510, to determine the relative spatial relationship between the head of the user 510 and the object.

The user 510 may be surrounded by a plurality of objects, including, for example, an object 520, an object 530, an object 540, an object 550, etc., each of which may have corresponding audio information. When the user's head is facing the object 530, the volume of the audio information of the object 530 may be, for example, higher. When the user's head turns to the object 540, the volume of the audio information of the object 530 may be decreased, and a volume of the audio information of the object 540 may be increased, to implement a hop reading of the user's audio information, which enables the user to be immersed in the environment and improves the user interaction.

Figure 6:
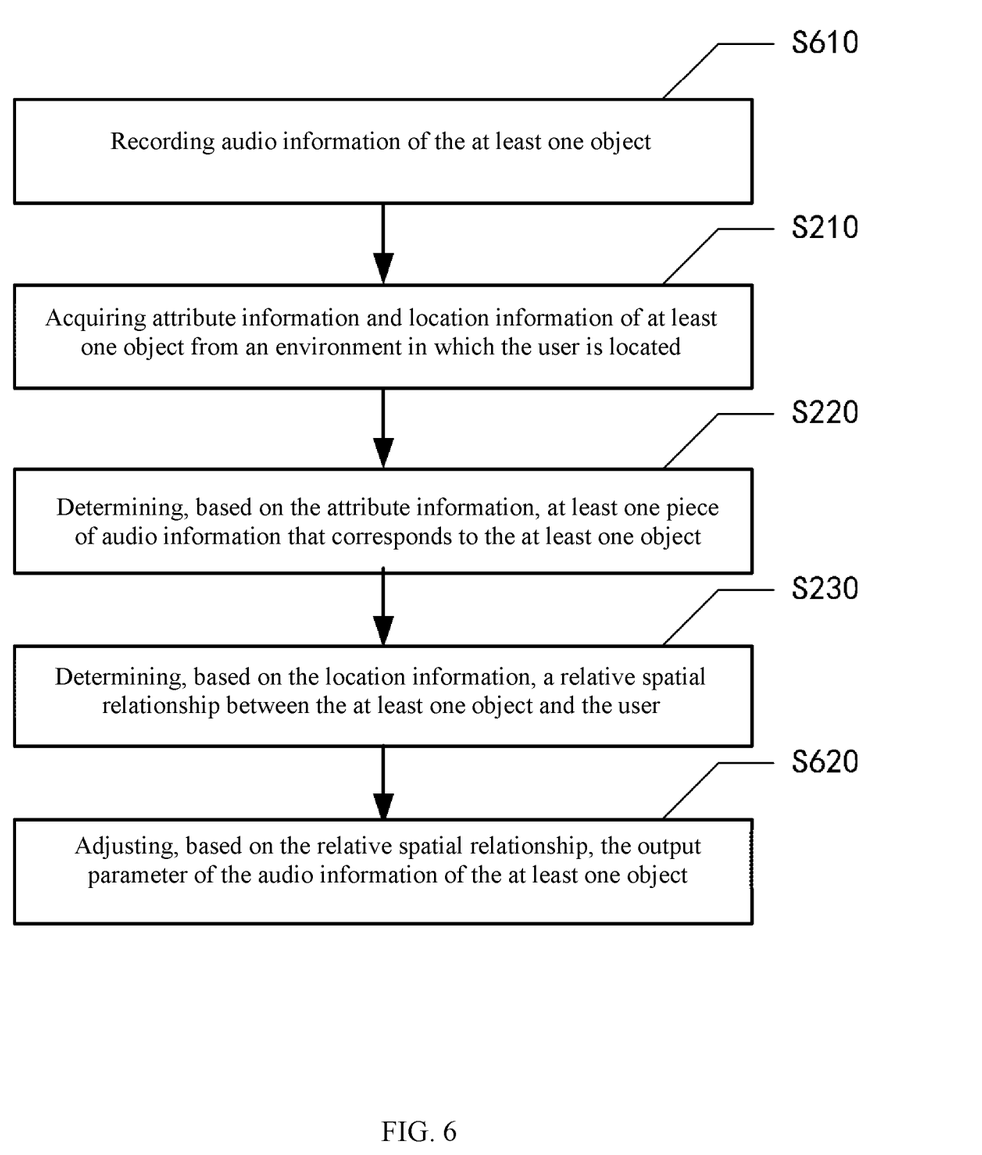
FIG. 6 illustrates a fourth flowchart of an audio output method according to some embodiment of the present disclosure.

FIG. 6 illustrates a flow chart of an audio output method according to some embodiment of the present disclosure.

As shown in FIG. 6, the method includes steps S210 to S230 and S610 to S620. The steps S210 to S230 are the same with or similar to those described above with reference to FIG. 2, and details are not described herein again.

In step S610, audio information of the at least one object is recorded.

According to some embodiment of the present disclosure, by recording the audio information of the object and storing the audio information in association with the attribute information of the object in the sound source database, the audio information of the stored object from the sound source database can be acquired based on the attribute information after acquiring the attribute information of the object from the environment in which the user is located.

In step S620, an output parameter of a recorded audio information of the at least one object may be adjusted based on the relative spatial relationship.

After the audio information of the recorded object is acquired from the sound source database, the output parameter of the audio information is adjusted based on the relative spatial relationship between the object and the user.

Figure 7:
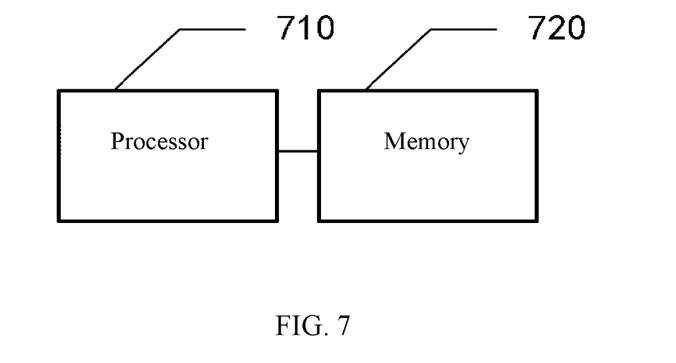
FIG. 7 is a schematic block diagram of an electronic device according to some embodiment of the present disclosure.

FIG. 7 is a schematic block diagram of an electronic device according to some embodiment of the present disclosure.

In some embodiment of the present disclosure, an electronic device 700 includes a processor 710 and a memory 720 for storing executable instructions. When the instructions are executed by the processor 710, the processor 710 is caused to perform: acquiring attribute information of at least one object from the environment in which the user is located; determining, based on the attribute information, at least one piece of audio information that corresponds to the at least one object, and determining, based on the location information, a relative spatial relationship between the at least one object and the user; adjusting, based on the relative spatial relationship, an output parameter of the at least one audio information; and outputting the at least one piece of audio information according to the output parameter, so that the user can perceive the location information of the corresponding object based on the at least one piece of audio information.

According to some embodiment of the present disclosure, the processor 710 is further configured to: determine a specific object from the at least one object, and adjust the output parameter of the at least one piece of audio information based on the relative spatial relationship, including: adjusting, based on the relative spatial relationship, the output parameter of the audio information to be a first output parameter, and/or adjusting, based on the relative spatial relationship, the output parameter that corresponds to a non-specific object from the at least one object to be a second output parameter.

According to some embodiment of the present disclosure, determining the specific object from the at least one object includes: selecting, based a user's selection operation, the specific object from the at least one object; or determining, based on the relative position of the at least one object and the user, an object satisfying a preset condition to be the specific object.

According to some embodiment of the present disclosure, the processor 710 is further configured to: acquire a relative position of a body part of the user to the at least one object; and when a relative position of the body part of the user to the at least one object changes from a first relative position to a second relative position, adjust the output parameter of the audio information that corresponds to the at least one object.

According to some embodiment of the present disclosure, acquiring attribute information and location information of at least one object from an environment in which the user is located includes at least one of: acquiring the attribute information and the location information of the at least one object from the environment in which the user is located by image recognition; acquiring a tag information of the at least one object from the environment in which the user is located, the tag information including the attribute information and the location information of the at least one object; or acquiring an object identifier of the at least one object from the environment in which the user is located, and determine, based on the object identifier, the attribute information of the at least one object, and determine, based on the object identifier and electronic map data, the location information of the at least one object.

According to some embodiment of the present disclosure, the processor 710 is further configured to: record the audio information of the at least one object, and adjust the output parameter of the at least one piece of audio information based on the relative spatial relationship, including: based on the relative spatial relationship, adjusting the output parameter of the recorded audio information of the at least one object.

According to some embodiment of the present disclosure, the at least one object includes: a real object and/or a virtual object.

Figure 8:
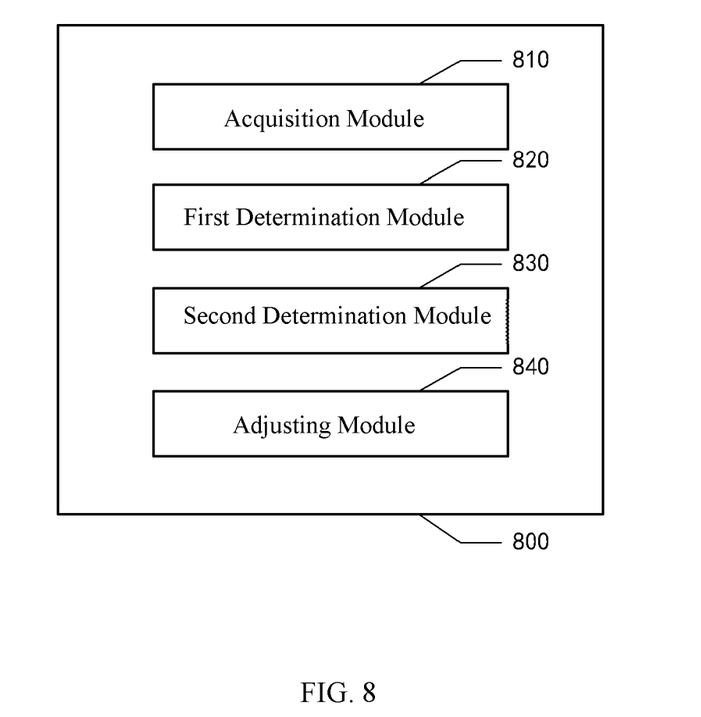
FIG. 8 is a schematic block diagram showing an audio output apparatus according to some embodiment of the present disclosure.

FIG. 8 is a schematic block diagram of an audio output apparatus according to some embodiment of the present disclosure.

As shown in FIG. 8, an audio output apparatus 800 includes: an acquisition module 810, a first determination module 820, a second determination module 830, and an adjustment module 840.

The acquisition module 810 may be configured to acquire the attribute information and the location information of the at least one object from the environment in which the user is located.

According to some embodiment of the present disclosure, acquiring the attribute information and the location information of the at least one object from the environment in which the user is located includes at least one of: acquiring the attribute information and the location information of the at least one object from the environment in which the user is located by image recognition; acquiring a tag information of the at least one object from the environment in which the user is located, the tag information including the attribute information of at least one object and the location information; or acquiring an object identifier of the at least one object from the environment in which the user is located, determining, based on the object identifier, the attribute information of the at least one object, and determining, based on the object identifier and electronic map data, the location information of the at least one object.

According to some embodiment of the present disclosure, the at least one object includes: a real object and/or a virtual object.

According to some embodiment of the present disclosure, the acquisition module 810 may perform, for example, the step S210 described above with reference to FIG. 2, and details are not described herein again.

The first determination module 820 may be configured to determine, based on the attribute information, at least one piece of audio information that corresponds to the at least one object. According to some embodiment of the present disclosure, the first determination module 820 may perform, for example, the step S220 described above with reference to FIG. 2, and details are not described herein again.

The second determination module 830 may be configured to determine the relative spatial relationship between the at least one object and the user based on the location information. According to some embodiment of the present disclosure, the second determination module 830 may perform, for example, the step S230 described above with reference to FIG. 2, and details are not described herein again.

The adjustment module 840 may be configured to adjust the output parameter of the at least one piece of audio information based on the relative spatial relationship, and output the at least one piece of audio information based on the output parameter, so that the user can perceive the location information of the corresponding object based on the at least one piece of audio information. According to some embodiment of the present disclosure, the adjustment module 840 may perform, for example, the step S240 described above with reference to FIG. 2, and details are not described herein again.

According to some embodiment of the present disclosure, the apparatus further includes: a third determination module for determining a specific object from the at least one object, and adjusting the output parameter of the at least one audio information based on the relative spatial relationship, including: based on the relative spatial relationship, adjusting an output parameter of the audio information that corresponds to the specific object to be a first output parameter, and/or based on the relative spatial relationship, adjusting an output parameter of audio information that corresponds to the non-specific object in the at least one object to be a second output parameter.

According to some embodiment of the present disclosure, determining a specific object from the at least one object includes: selecting, based on the user's selection operation, the specific object from the at least one object; and determining, based on the relative spatial relationship between the at least one object and the user, an object satisfying a preset condition to be the specific object.

According to some embodiment of the present disclosure, the apparatus further includes: a second acquisition module for acquiring a relative position of the body part of the user to the at least one object; and when the relative position of the body part of the user to the at least one object changes from a first relative position to a second relative position, adjusting the output parameter of the audio information that corresponds to the at least one object.

According to some embodiment of the present disclosure, the apparatus further includes: a recording module for recording the audio information of the at least one object, and based on the relative spatial relationship, adjusting the output parameter of the at least one audio information, including: based on the relative spatial relationship adjusting the output parameter of the recorded audio information of the at least one object.

According to some embodiment of the present disclosure, any of a plurality of modules, sub-modules, units, sub-units, or at least some of the functions of any of the plurality of modules, sub-modules, units, sub-unites may be implemented in one module. Any one or more of the modules, sub-modules, units, sub-units according to some embodiment of the present disclosure may be implemented by splitting into multiple modules. Any one or more of the modules, sub-modules, units, sub-units according to some embodiment of the present disclosure may be at least partially implemented as hardware circuitry, such as a field-programmable gate array (FPGA), a programmable logic array (PLA), system-on-a-chip, system on a substrate, system in a package, an application-specific integrated circuit (ASIC), or any other reasonable means of hardware or firmware that integrates or packages the circuit, or may be implemented by any one or any suitable combination of software, hardware, and firmware. Alternatively, one or more of the modules, sub-modules, units, sub-units according to some embodiment of the present disclosure may be at least partially implemented as a computer program module that, when executed, can perform corresponding functions.

For example, any plurality of the acquisition module 810, the first determination module 820, the second determination module 830, and the adjustment module 840 may be implemented in one module, or any one of the modules may be split into multiple modules. Alternatively, at least some of the functions of one or more of the modules may be combined with at least some of the functions of the other modules and implemented in one module. According to some embodiment of the present disclosure, at least one of the acquisition module 810, the first determination module 820, the second determination module 830, and the adjustment module 840 may be at least partially implemented as a hardware circuit, such as a field programmable gate array (FPGA), programmable logic array (PLA), system-on-a-chip, system on a substrate, system in a package, an application-specific integrated circuit (ASIC), or hardware or firmware by any other reasonable means of integrating or packaging the circuit, or may be implemented by any one or a suitable combination of software, hardware, and firmware. Alternatively, at least one of the acquisition module 810, the first determining module 820, the second determining module 830 and the adjusting module 840 may be at least partially implemented as a computer program module, and when executed, may perform the corresponding functions.

Figure 9:
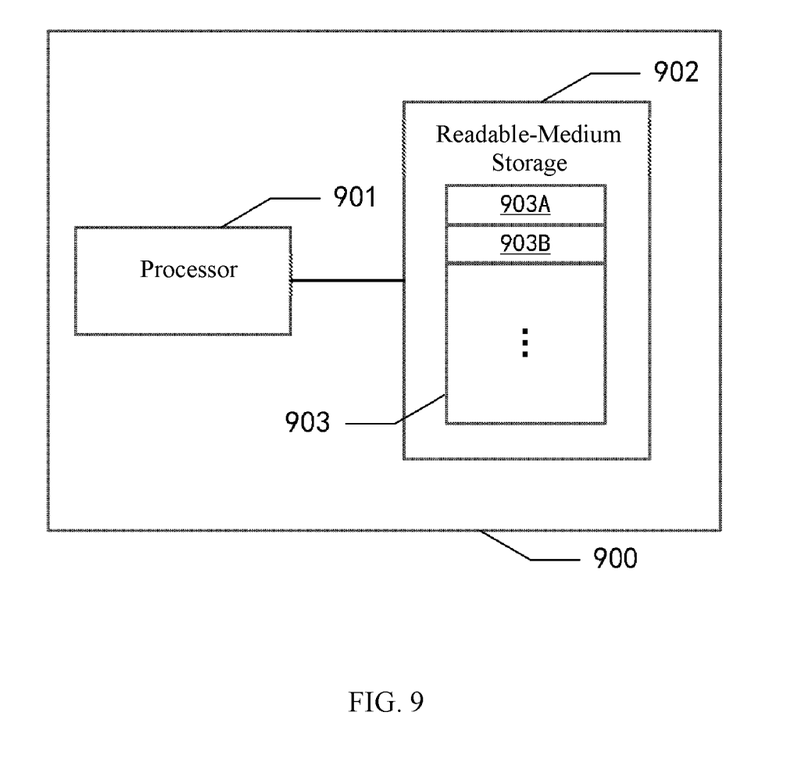
FIG. 9 is a schematic block diagram showing a computer system for outputting audio according to some embodiment of the present disclosure.

FIG. 9 is a schematic block diagram of a computer system for playing audio according to some embodiment of the present disclosure. The computer system shown in FIG. 9 is merely an example and should not impose any limitation on the function and the scope of use of the embodiments of the present disclosure.

As shown in FIG. 9, computer system 900 for implementing audio output includes: a processor 901, a computer-readable storage medium 902. The system 900 can perform the method according to some embodiment of the present disclosure.

Specifically, the processor 901 may include: a general-purpose microprocessor, an instruction set processor, and/or a related chipset and/or a special-purpose microprocessor (i.e., an application-specific integrated circuit (ASIC)), etc. The processor 901 may also include an onboard memory for caching purposes. The processor 901 may be a single processing unit or a plurality of processing units for performing different actions of a method flow according to some embodiments of the present disclosure.

The computer-readable storage medium 902 may be, for example, any medium that can contain, store, communicate, propagate or transmit instructions. For example, a readable-storage medium may include, but is not limited to, electronic, magnetic, optical, electromagnetic, infrared, or semiconductor system, apparatus, device, or propagation medium. Specific examples of the readable-storage medium include: a magnetic storage device such as a magnetic tape or a hard disk (HDD), an optical storage device such as a compact disk (CD-ROM), a memory such as a random-access memory (RAM) or a flash memory, and/or a wired/wireless communication link.

The computer-readable storage medium 902 may include a computer program 903, which may include code/computer executable instructions that, when executed by the processor 901, cause the processor 901 to perform a method according to some embodiments of the present disclosure or any variation thereof.

The computer program 903 may be configured to have, for example, computer program code including a computer program module. For example, in an exemplary embodiment, the code in the computer program 903 may include one or more program modules, including, for example, module 903A, module 903B. It should be noted that the division manner and the number of modules may not be fixed, and those skilled in the art may use suitable program modules or program module combinations according to actual situations. When these program module combinations are executed by the processor 901, the processor 901 may perform a method according to some embodiments of the present disclosure or any variation thereof.

According to some embodiment of the present disclosure, at least one of the acquisition module 810, the first determination module 820, the second determination module 830, and the adjustment module 840 may be implemented as a computer program module as shown in FIG. 9, and when executed by the processor 901, can implement corresponding operations described above.

The present disclosure also provides a computer-readable medium, which may be included in the apparatus/device/system described in the above embodiments; or may be separately present without being incorporated into the apparatus/device/system. The computer-readable medium carries one or more programs that, when executed, implement an audio output method. The audio output method includes: acquiring attribute information and location information of at least one object in an environment in which a user is located; determining, based on the attribute information, at least one piece of audio information that corresponds to the at least one object; determining, based on the location information, a relative spatial relationship between the at least one object and the user; adjusting, based on the relative spatial relationship, an output parameter of the at least one piece of audio information; and outputting, based on the output parameter, the at least one piece of audio information, so that the user can perceive the location information of the at least one object according to the at least one audio information.

According to some embodiment of the present disclosure, the method further includes: determining a specific object from the at least one object, and adjusting an output parameter of the at least one audio information based on the relative spatial relationship, including: adjusting, based on the relative spatial relationship, an output parameter of the audio information that corresponds to the specific object to be a first output parameter; and/or adjusting, based on the relative spatial relationship, an output parameter of the audio information that corresponds to a non-specific object in the at least one object to be a second output parameter.

According to some embodiment of the present disclosure, determining a specific object from the at least one object includes: selecting, based on a user's selection operation, the specific object from the at least one object; and determining, based on the relative spatial relationship between the at least one object and the user, an object satisfying a preset condition as the specific object.

According to some embodiment of the present disclosure, the method further includes: acquiring a relative position of a body part of the user to the at least one object, and when the relative position of the body part of the user to the at least one object changes from a first relative position to a second relative position, adjusting the output parameter of the audio information that corresponds to the at least one object.

According to some embodiment of the present disclosure, acquiring attribute information and location information of at least one object from an environment in which the user is located includes at least one of: acquiring the attribute information and the location information of the at least one object from the environment in which the user is located by image recognition; acquiring a tag information of the at least one object from the environment in which the user is located, the tag information including the attribute information and the location information of the at least one object; and acquiring an object identifier of the at least one object from the environment in which the user is located, and determining, based on the object identifier, the attribute information of the at least one object, and determining, based on the object identifier and electronic map data, the location information of the at least one object.

According to some embodiment of the present disclosure, the method further includes: recording the audio information of the at least one object, and adjusting, based on the relative spatial relationship, an output parameter of the at least one piece of audio information, including: adjusting, based on the relative spatial relationship, the output parameter of the recorded audio information of the at least one object.

According to some embodiment of the present disclosure, the at least one object includes: a real object and/or a virtual object.

According to some embodiment of the present disclosure, the computer-readable medium may be a computer-readable signal medium, a computer-readable storage medium or a combination thereof. The computer-readable storage medium can be, for example, but not limited to, electronic, magnetic, optical, electromagnetic, infrared, or semiconductor system, apparatus, or device, or any combination thereof. More specific examples of the computer-readable storage medium may include, but are not limited to, electrical connections having one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination thereof. In the present disclosure, a computer-readable storage medium may be any tangible medium that can contain or store a program, which can be used by or in connection with an instruction execution system, apparatus, or device. In the present disclosure, the computer-readable signal medium may include a data signal that is propagated in the baseband or as part of a carrier, carrying computer-readable program code. Such propagated data signals can take a variety of forms including, but not limited to, electromagnetic signals, optical signals, or any suitable combination thereof. The computer-readable signal medium may also be any computer-readable medium other than a computer-readable storage medium, which can transmit, propagate, or transport a program for use by or in connection with the instruction execution system, apparatus, or device. The program code embodied in the computer-readable medium can be transmitted by any suitable medium, including, but not limited to, wireless, wired, optical cable, radio frequency signals, etc., or any suitable combination thereof.

The flowchart and block diagrams in the drawings illustrate the architecture, functions, and operations of possible implementations of systems, methods, and computer program products in accordance with various embodiments of the present disclosure. In this regard, each block of the flowchart or block diagrams can represent a module, a program segment, or a portion of code that includes one or more executable instructions. It should also be noted that in some alternative implementations, the functions noted in the blocks may also occur in a different order than that illustrated in the drawings. For example, two successively represented blocks may in fact be executed substantially in parallel, and they may sometimes be executed in the reverse order, depending upon the functions involved. It should also be noted that each block of the block diagrams or flowcharts, and combinations of blocks in the block diagrams or flowcharts, may be implemented in a dedicated hardware-based system that performs specified functions or operations, or may be implemented by a combination of hardware and computer instructions.

Those skilled in the art can appreciate that various combinations of the features of the embodiments and/or claims of the present disclosure are possible, even if such combinations are not explicitly recited in the present disclosure. In particular, various combinations of the features described in the embodiments and/or claims of the present disclosure can be made without departing from the spirit and scope of the present disclosure. All such combinations fall within the scope of the present disclosure.

Although the present disclosure has been shown and described with respect to the specific exemplary embodiments of the present disclosure, it will be understood by those skilled in the art that variations in form and detail can be made to the present disclosure. Therefore, the scope of the present disclosure should not be limited to the above-described embodiments, but should be determined not only by the appended claims but also by the equivalents of the appended claims.

What is claimed is:

1. An audio output method, comprising:
    acquiring attribute information and location information, by an audio output apparatus worn by a user, of at least one specific object not predetermined by mutually communicative electronics, from an environment in which the user is located, acquiring the attribute information including identifying the at least one specific object by image recognition or sound recognition;
    recording, by the audio output apparatus, audio information of the at least one specific object and storing the audio information in association with the attribute information of the at least one specific object in a sound source database;
    determining, by the audio output apparatus, based on the attribute information from the sound source database, at least one piece of audio information that corresponds to the at least one specific object;
    determining, by the audio output apparatus, based on the location information, a relative spatial relationship between the at least one specific object and the user;
    adjusting, by the audio output apparatus, based on the relative spatial relationship, an output parameter of the at least one piece of audio information; and
    outputting, by the audio output apparatus, based on the output parameter, the at least one piece of audio information indicative of the location information of the at least one specific object, wherein the outputting of the audio information includes preventing audio information of non-specific object from affecting the audio information of the at least one specific object.

2. The method according to claim 1, further comprising:
    acquiring a relative position of a body part of the user to the at least one specific object; and
    in response to the relative position of the body part of the user to the at least one specific object changes from a first relative position to a second relative position, adjusting the output parameter of the audio information that corresponds to the at least one specific object.

3. The method according to claim 1, wherein acquiring the attribute information and the location information of the at least one specific object from the environment in which the user is located comprises at least one of:
    acquiring tag information of the at least one specific object from the environment in which the user is located, the tag information including the attribute information of the at least one specific object and the location information; or acquiring an object identifier of the at least one specific object from the environment in which the user is located, determining, based on the object identifier, the attribute information of the at least one specific object, and determining, based on the object identifier and electronic map data, the location information of the at least one specific object.

4. The method according to claim 1, wherein the at least one specific object comprises: a real object or a virtual object.

5. An electronic device, comprising:
one or more processors; and
a memory storing computer executable instructions, when executed, causing the one or more processors to:
acquire attribute information and location information of at least one specific object, not predetermined by mutually communicative electronics, from an environment in which a user is located, acquiring the attribute information including identifying the at least one specific object by image recognition or sound recognition, and the attribute information characterizing a naturally inherent trait of the at least one specific object;
record audio information of the at least one specific object and storing the audio information in association with the attribute information of the at least one specific object in a sound source database;
determine, based on the attribute information from the sound source database, at least one piece of audio information that corresponds to the at least one specific object;
determine, based on the location information, a relative spatial relationship between the at least one specific object and the user;
adjust, based on the relative spatial relationship, an output parameter of the at least one piece of audio information; and
output, based on the output parameter, the at least one piece of audio information indicative of the location information of the at least one specific object, wherein the outputting of the audio information includes preventing audio information of non-specific object from affecting the audio information of the at least one specific object and the electronic device is an audio output apparatus wore by the user.

6. The electronic device according to claim 5, wherein the computer executable instructions, when executed, cause the one or more processors to:
acquire a relative position of a body part of the user to the at least one specific object; and
in response to the relative position of the body part of the user to the at least one specific object changes from a first relative position to a second relative position, adjust the output parameter of the audio information that corresponds to the at least one specific object.

7. The electronic device according to claim 5, wherein acquiring the attribute information and the location information of the at least one specific object from the environment in which the user is located comprises at least one of:
acquiring tag information of the at least one specific object from the environment in which the user is located, the tag information including the attribute information of the at least one specific object and the location information; or
acquiring an object identifier of the at least one specific object from the environment in which the user is located, determining, based on the object identifier, the attribute information of the at least one specific object, and determining, based on the object identifier and electronic map data, the location information of the at least one specific object.

8. An audio output apparatus, comprising:
an acquisition module, configured to acquire attribute information and location information of at least one specific object from an environment in which a user is located, acquiring the attribute information including identifying the at least one specific object by image recognition or sound recognition;
a recording module, configured to record audio information of the at least one specific object and store the audio information in association with the attribute information of the at least one specific object in a sound source database;
a first determination module, configured to determine from the sound source database, based on the attribute information, at least one piece of audio information that corresponds to the at least one specific object;
a second determination module, configured to determine, based on the location information, a relative spatial relationship between the at least one specific object and the user; and
an adjusting module, configured to adjust, based on the relative spatial relationship, an output parameter of the at least one audio information, and output, based on the output parameter, the at least one piece of audio information indicative of the location information of the at least one specific object, wherein the outputting of the audio information includes preventing audio information of non-specific object from affecting the audio information of the at least one specific object, and the audio output apparatus is worn by the user.

9. The audio output apparatus according to claim 8, wherein the acquisition module is a first acquisition module;
the apparatus further comprising:
a second acquisition module, configured to: acquire a relative position of a body part of the user to the at least one specific object; and when the relative position of the body part of the user to the at least one specific object changes from a first relative position to a second relative position, adjust the output parameter of the audio information that corresponds to the at least one specific object.

* * * * *